(12) United States Patent
Chang et al.

(10) Patent No.: US 9,019,246 B2
(45) Date of Patent: Apr. 28, 2015

(54) ELECTRONIC WRITING SYSTEM AND OPERATING METHOD THEREOF

(71) Applicant: AU Optronics Corp., Hsin-Chu (TW)

(72) Inventors: Wei-Tien Chang, Hsin-Chu (TW); Shau-Yu Tsai, Hsin-Chu (TW)

(73) Assignee: AU Optronics Corp., Science-Based Indusrial Park, Hsin-Chu (TW)

( * ) Notice: Subject to any disclaimer, the term of this patent is extended or adjusted under 35 U.S.C. 154(b) by 91 days.

(21) Appl. No.: 13/672,722

(22) Filed: Nov. 9, 2012

(65) Prior Publication Data

US 2013/0127792 A1 May 23, 2013

(30) Foreign Application Priority Data

Nov. 18, 2011 (TW) .............................. 100142431 A

(51) Int. Cl.
*G06F 3/0354* (2013.01)
*G06F 3/03* (2006.01)
*G06F 3/038* (2013.01)
*G06F 3/041* (2006.01)
*G06F 3/042* (2006.01)

(52) U.S. Cl.
CPC ............ *G06F 3/0321* (2013.01); *G06F 3/0386* (2013.01); *G06F 3/0412* (2013.01); *G06F 3/042* (2013.01); *G06F 3/03542* (2013.01)

(58) Field of Classification Search
CPC ................... G02B 6/00; G02B 6/0001; G02B 6/0013–6/0096; G02B 6/12–6/125; G02B 6/24–6/29377; G02B 6/322; G02B 6/3353; G02B 6/3624; G02B 6/3812–6/3813; G02B 6/3838–6/3842; G02B 6/42; G02B 6/424–6/4243; G02B 6/4289–6/4298; G02B 19/0052–19/0057; G02B 23/26; G02B 1/045–1/048; G06F 3/03545; G06F 2203/04101; G06F 2203/04108; G06F 3/0317–3/033; G06F 3/0354; G06F 3/03542; G06F 3/037; G06F 3/0386; G06F 2200/1632; G06F 2203/04104; G06F 2203/04106; G06F 2203/04807–2203/04808
USPC ...................... 345/172–184; 178/18.01–20.01
See application file for complete search history.

(56) References Cited

U.S. PATENT DOCUMENTS

| | | | |
|---|---|---|---|
| 4,711,977 A * | 12/1987 | Miyamori et al. ......... | 178/18.07 |
| 2005/0162398 A1 | 7/2005 | Eliasson | |
| 2006/0033713 A1 | 2/2006 | Pryor | |
| 2006/0139956 A1 | 6/2006 | Soh | |
| 2007/0097504 A1 * | 5/2007 | Li et al. .......................... | 359/494 |
| 2009/0309841 A1 * | 12/2009 | Wilson et al. ................. | 345/173 |
| 2010/0039408 A1 * | 2/2010 | Cho et al. ...................... | 345/175 |
| 2010/0224758 A1 * | 9/2010 | Kuo et al. .................. | 250/203.1 |
| 2010/0315377 A1 * | 12/2010 | Chang et al. .................. | 345/175 |
| 2011/0090702 A1 * | 4/2011 | Ho et al. .................. | 362/311.02 |

FOREIGN PATENT DOCUMENTS

| | | |
|---|---|---|
| CN | 1794052 A | 6/2006 |
| TW | 200502917 | 1/2005 |
| TW | I292120 | 1/2008 |

* cited by examiner

*Primary Examiner* — Sanghyuk Park
(74) *Attorney, Agent, or Firm* — Winston Hsu; Scott Margo

(57) ABSTRACT

The present disclosure provides an electronic writing system including a holder, a light guide plate, at least one light source, and at least one optical film. The light guide plate is disposed in the holder, and the light guide plate has at least one light entrance surface and a light exit surface. The light source is disposed on the light entrance surface of the light guide plate, and is used for generating a light. The light enters the light guide plate through the light entrance surface, and the light emits out of the light guide plate from the light exit surface. The optical film covers the light exit surface of the light guide plate.

17 Claims, 12 Drawing Sheets

ELECTRONIC WRITING SYSTEM AND OPERATING METHOD THEREOF

BACKGROUND OF THE DISCLOSURE

1. Field of the Disclosure

The present disclosure is related to an electronic writing system and an operation method thereof.

2. Description of the Prior Art

Conventional electronic writing system is composed of a display, such as a liquid crystal display (LCD), and a touch-control pen, such as a light pen, and the display needs to have a sensing device for sensing the input signal from the touch-control pen. The electronic writing system can be classified into resistance type, capacitor type and optical type electronic writing systems according to the sensing method. However, the cost of resistance type or capacitor type electronic writing systems with large sizes is very high, thus usually the optical type sensing method is mainly adopted in electronic writing systems with large sizes.

With reference to FIG. 1, FIG. 1 is a schematic diagram of a conventional optical type electronic writing system having a large size. As shown in FIG. 1, the conventional electronic writing system 10 has a display 12, which shows several functional icons 12a designed by software to represent different functions. For example, the functional icons 12a may be a color selecting icon for selecting different colors or an eraser icon for removing the image. Although a light pen 14 can be used in the conventional electronic writing system 10 for handwriting, usually the light pen 14 can produce only one single color in the display and the user cannot switch the color of the light pen 14 to other colors. Furthermore, the light pen 14 usually does not have the eraser function for removing images. Therefore, if the user wants to execute other functions of the electronic writing system 10, he has to touch the functional icons 12a for switching the function. Taking the eraser function as an example, when the display 12 of the electronic writing system 10 is very large, the user has to walk for along distance in order to touch the functional icon 12a for switching on the eraser function and then go back to the original place to keep on writing. This makes the user inconvenient and the design is unfriendly for the user.

As a result, to solve the inconvenience problem of erasing image is still an issue for manufactures.

SUMMARY OF THE DISCLOSURE

It is therefore one of the main objectives of the present disclosure to provide an electronic writing system and an operation method thereof for solving the problem of inconvenience of erasing image.

In order to achieve the above-mentioned objective, the present disclosure provides an electronic writing system which includes a display device and an image eraser. The image eraser includes a holder, a light guide plate (LGP), at least one light source and at least one optical film. The LGP is disposed in the holder and has at least one light entrance surface and a light exit surface. The light source is disposed on the light entrance surface of the LGP, used for generating a light, wherein the light enters the LGP through the light entrance surface and emit out of the LGP from the light exit surface. The optical film covers the light exit surface of the LGP.

In order to achieve the above-mentioned objective, the present disclosure provides an operation method of an electronic writing system. First, a pattern is drawn on a display device, wherein the display device has a plurality of pixel regions and a plurality of sensing regions, portions of the display device in the pixel region are used for displaying an image respectively, and portions of the display device in the sensing regions are used for sensing light. Each of the sensing regions is corresponding to at least one pixel region, so that when the portion of the display device in one of the sensing region receives a light, it sends out a display signal to the portion of the display device in the corresponding pixel region, wherein the display device includes a plurality of first color filters having a first color, a plurality of second color filters having a second color and a plurality of a third color filters having a third color respectively disposed in each of the sensing regions. Then, an image eraser is switched on to generate a first light with a fourth color that is a mixture of at least two colors selected from the first color, the second color and the third color to illuminate the display device with the first light, so as to erase a portion of the pattern.

In the electronic writing system of the present disclosure, a movable image eraser is utilized to generate the light with a mixture color of at least two of the first color, the second color and the third color for sending out an erasing signal to the display device, so as to remove the displayed image in the corresponding pixel region and enable the corresponding pixel region to display a blank image or a white image. Accordingly, when the user wants to erase a pattern, he does not need to switch to the eraser function by walking for a long distance for selecting the functional icon representing eraser function anymore, and the user could directly use the image eraser to remove the image displayed by the display device, so as to decrease the operation inconvenience.

These and other objectives of the present disclosure will no doubt become obvious to those of ordinary skill in the art after reading the following detailed description of the preferred embodiment that is illustrated in the various figures and drawings.

DETAILED DESCRIPTION

The electronic writing system of the present disclosure includes a display device and an image eraser, and the image eraser sends out an erasing signal by generating a light to a portion of the display device in the pixel region to remove image displayed by the portion of the display device in the corresponding pixel region having the optical sensor which senses the erasing signal, to enable the portion of the display device in the corresponding pixel region display a blank image or a white image. Accordingly, the user could directly clean the image displayed by the display device by using the image eraser, without walking for a long distance to select the functional icon representing the eraser function and then going back to the original place for keeping on writing. Therefore, the convenience is improved for the user.

Figure 1:
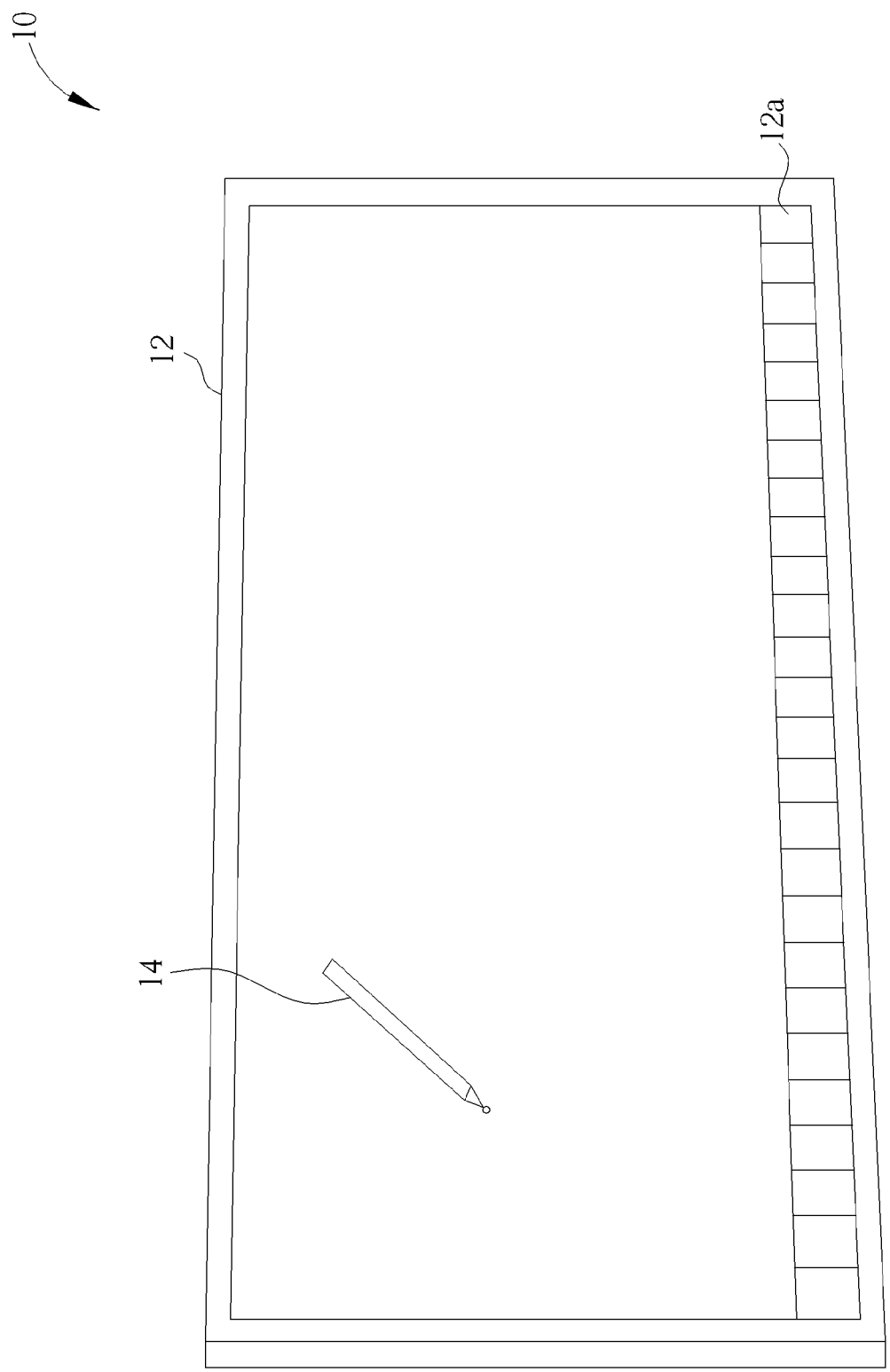
FIG. 1 is a schematic diagram of a conventional optical type electronic writing system having a large size.
Figure 2:
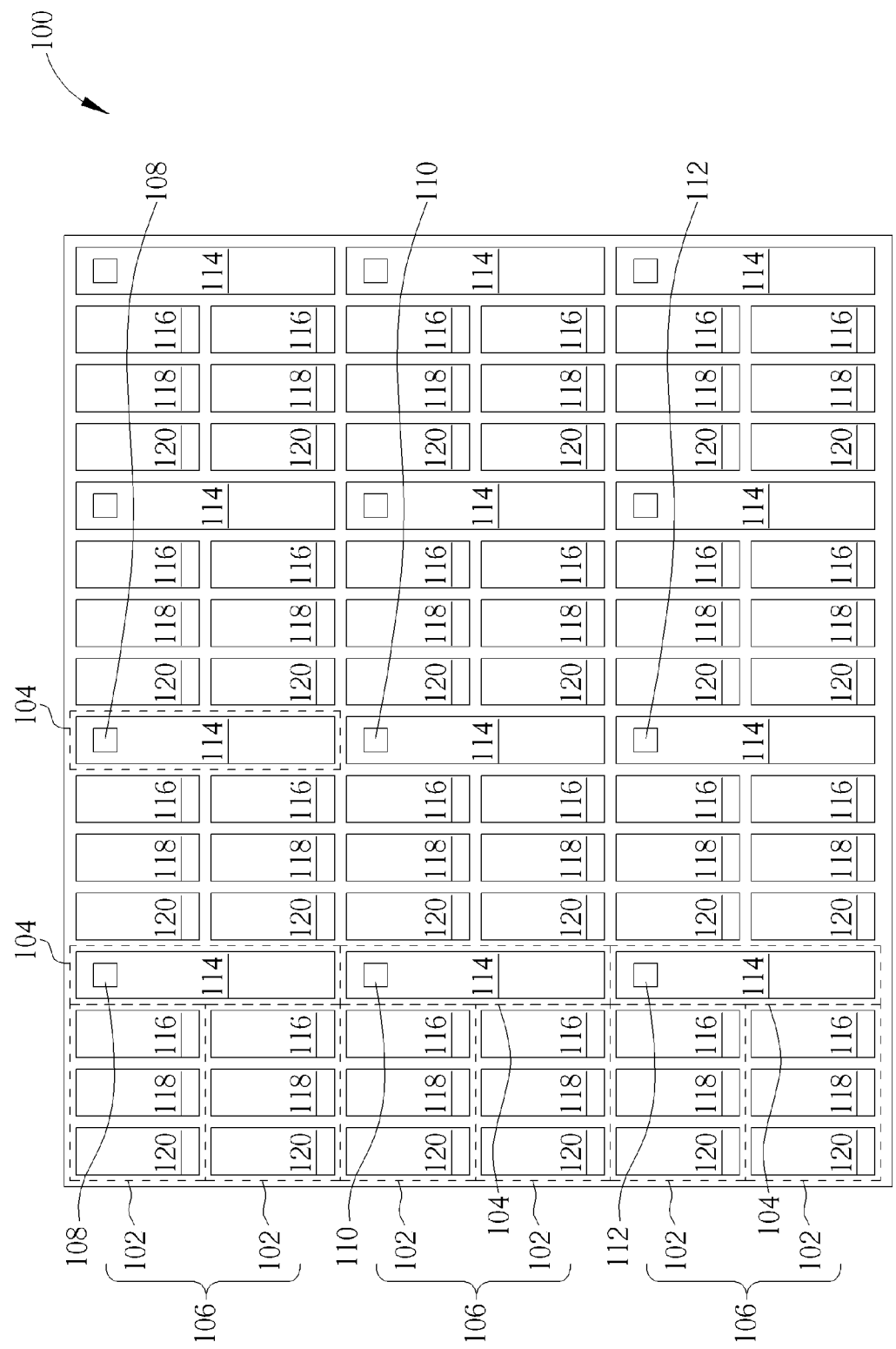
FIG. 2 is a top-view schematic diagram of a display device of an electronic writing system according to a first preferred embodiment of the present disclosure.

With reference to FIG. 2, FIG. 2 is a top-view schematic diagram of a display device of an electronic writing system according to a first preferred embodiment of the present disclosure. As shown in FIG. 2, the display device 100 has a plurality of pixel regions 102 and a plurality of sensing regions 104. Each of the sensing regions 104 is corresponding to at least one pixel region 102 and is disposed at a side of its corresponding pixel region 102. In this embodiment, the above-mentioned "at least one pixel regions 102" is explained by the example of two adjacent pixel regions 102, but not limited thereto. Therefore, two adjacent pixel regions 102 form a pixel region group 106, and the sensing regions 104 and the pixel region groups 106 are arranged as a matrix. In the same row, each of the pixel region groups 106 and each of the sensing regions 104 are alternately arranged in order. In the same column, only the pixel region groups 106 are sequentially arranged, or only the sensing regions 104 are sequentially arranged. Therefore, the sensing regions 104 and the pixel region group 106 are not arranged in the same column. Further, in one single pixel region group 106, the pixel regions 102 are arranged along the direction parallel with the column. However, the arrangement of the pixel regions 102 and sensing regions 104 of the present disclosure is not limited by the above description, and may be designed in other arranging way according to practical requirements. In addition, it is not limited that each of the sensing regions 104 of the present disclosure is corresponding to two adjacent pixel regions 102. Each sensing region 104 may be corresponding to at least one pixel region 102.

Furthermore, the display device 100 includes a plurality of first color filters 108, a plurality of second color filters 110 and a plurality of third color filters 112, and each of the first color filters 108, each of the second color filters 110 and each of the third color filters 112 are disposed in each of the sensing regions 104 respectively. The first color filters 108 have a first color, the second color filters 110 have a second color, and the third color filters 112 have a third color. The first color, the second color and the third color are different from each other. In this embodiment, the first color is red, the second color is green, and the third color is blue such that the mixture of the first color, the second color and the third color is white. Moreover, in the same column, each of the first color filters 108, each of the second color filters 110 and each of the third color filters 112 are sequentially and alternately arranged. In addition, the display device 100 further includes a plurality of optical sensors (not shown), and each of the first color filters 108, each of the second color filters 110 and each of the third color filters 112 cover each of the optical sensors respectively, such that each of the optical sensors is capable of respectively sensing the light with a color that penetrates each of the first color filters 108, each of the second color filters 110 and each of the third color filters 112. Each of the sensing regions 104 may further includes a transparent area 114, and each transparent area 114 surrounds each of the first color filters 108, the second color filters 110 and the third color filters 112 respectively. According to the present disclosure, the arrangement order and the colors of the color filters are not limited by the above description. In other embodiments of the present disclosure, the first color, the second color and the third color may also include the colors in the color coordinate, such as brown, yellow, purple, pink, indigo, etc.

In this embodiment, the display device 100 further includes a plurality of fourth color filters 116, a plurality of fifth color filters 118 and a plurality of sixth color filters 120. The fourth color filters 116 have the third color, the fifth color filters 118 have the second color, and the sixth color filters 120 have the first color. Wherein, each of the fourth color filters 116 is disposed in each pixel region 102 respectively, each of the fifth color filters 118 is disposed in each pixel region 102 respectively, and each of the sixth color filters 120 is disposed in each pixel regions 102 respectively. In each pixel region 102, the sixth color filter 120, the fifth color filter 118 and the fourth color filters 116 are arranged along the direction parallel with the row direction sequentially. The arrangement and colors of the color filters in the pixel regions 102 of the present disclosure are not limited by the above description. The color filters in the pixel regions 102 of the present disclosure may have different colors from that of the color filters in the sensing regions 104, and may have a triangle-type arrangement or other arrangements. Moreover, the display device 100 of the present disclosure may further include a plurality of color filters having other colors disposed in each of the pixel regions 102, but not limited thereto.

It should be noted that in the display device 100 of this embodiment, when the light with the color of one of the first color, the second color and the third color illuminates the display device 100, the light will pass through only one of the first color filters 108, the second color filters 110 and the third color filters 112, thus the optical sensors corresponding to one of the first color filters 108, the second color filters 110 and the third color filters 112 will sense the light and send out display signals to the pixel regions 102 corresponding to the optical sensors that sensing the light, so as to display a pattern. In this embodiment, the color of the pattern is identical to the color of the incident light. Therefore, if the display device 100 is illuminated by a light with the first color, the pixel regions 102 having the sixth color filters 120 will display the pattern. The present disclosure is not limited to the above description. The pattern may have a different color from that of the incident light. However, the color of the pattern has a relative relationship with the color of the incident light that is one of the first color, the second color and the third color. In addition, when a light with the color of a mixture of at least two of the first color, the second color and the third color illuminates the display device 100, the light will penetrate at least two of the first color filters 108, the second color filters 110 and the third color filters 112, thus the optical sensors corresponding to at least two of the first color filters 108, the second color filters 110 and the third color filters 112 will sense the light at the same time. Accordingly, the display device 100 estimates that at least two optical sensors are switched on so as to send out an erasing signal to the pixel regions 102 corresponding to the optical sensors that sense the light for executing the function of removing pattern.

The display device of the present disclosure is not limited by the aforementioned embodiment and may have other different preferred or variant embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 3:
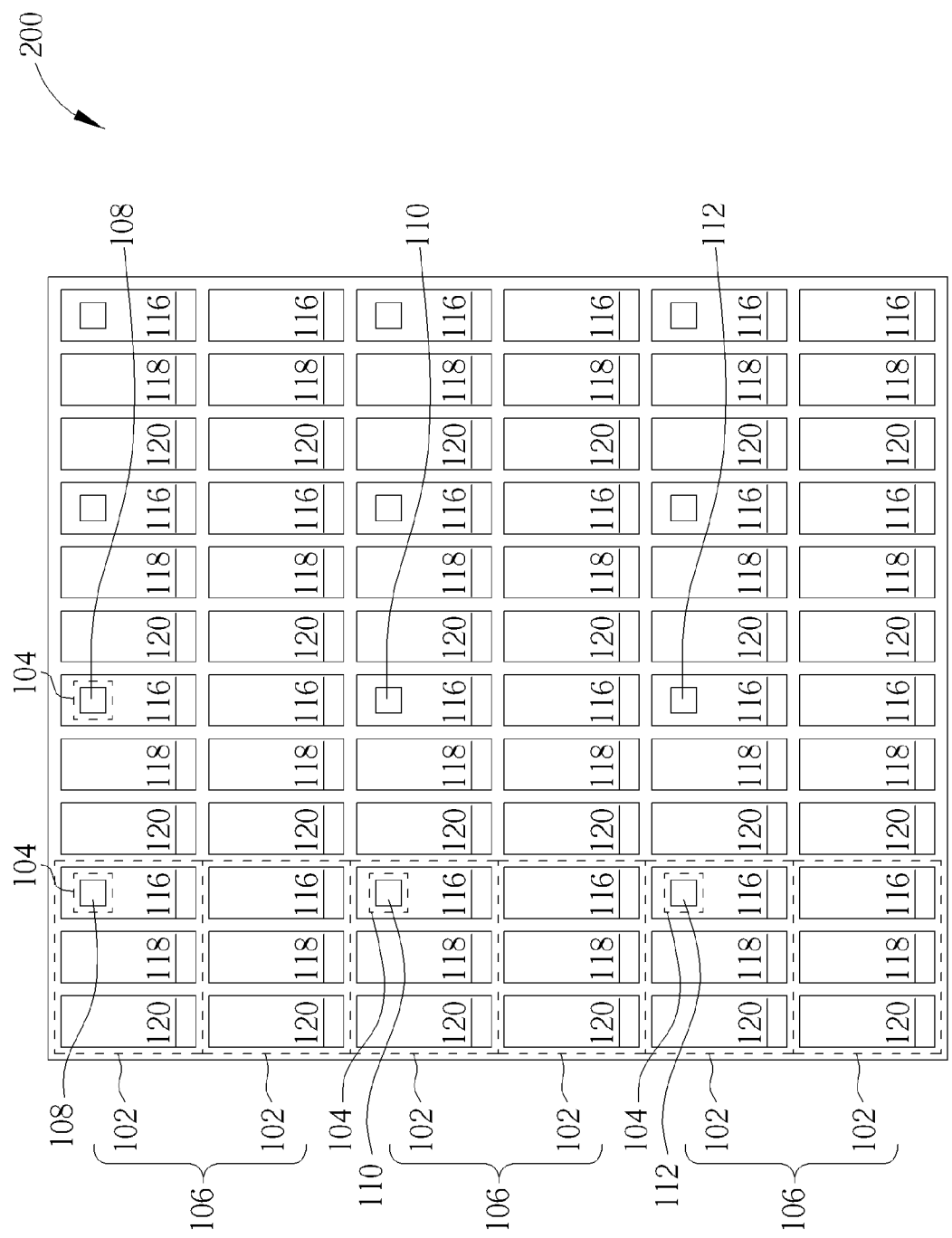
FIG. 3 is a top-view schematic diagram of a display device of an electronic writing system according to a second preferred embodiment of the present disclosure.

With reference to FIG. 3, FIG. 3 is a top-view schematic diagram of a display device of an electronic writing system according to a second preferred embodiment of the present disclosure. As shown in FIG. 3, in comparison with the display device of the first embodiment, each of the sensing regions 104 of the display device 200 of this embodiment is disposed in one of the fourth color filters 116 in its corresponding pixel region group 106, and each sensing region 104 does not have a transparent area. It should be noted that the fourth color filters 116 of this embodiment are blue color filters. Since human eyes have low sensitivity to blue light, disposing the sensing regions 104 in each fourth color filter 116 will not affect the color displayed by the display device 100 and can further effectively save the space for disposing the optical sensors in this embodiment.

Figure 4:
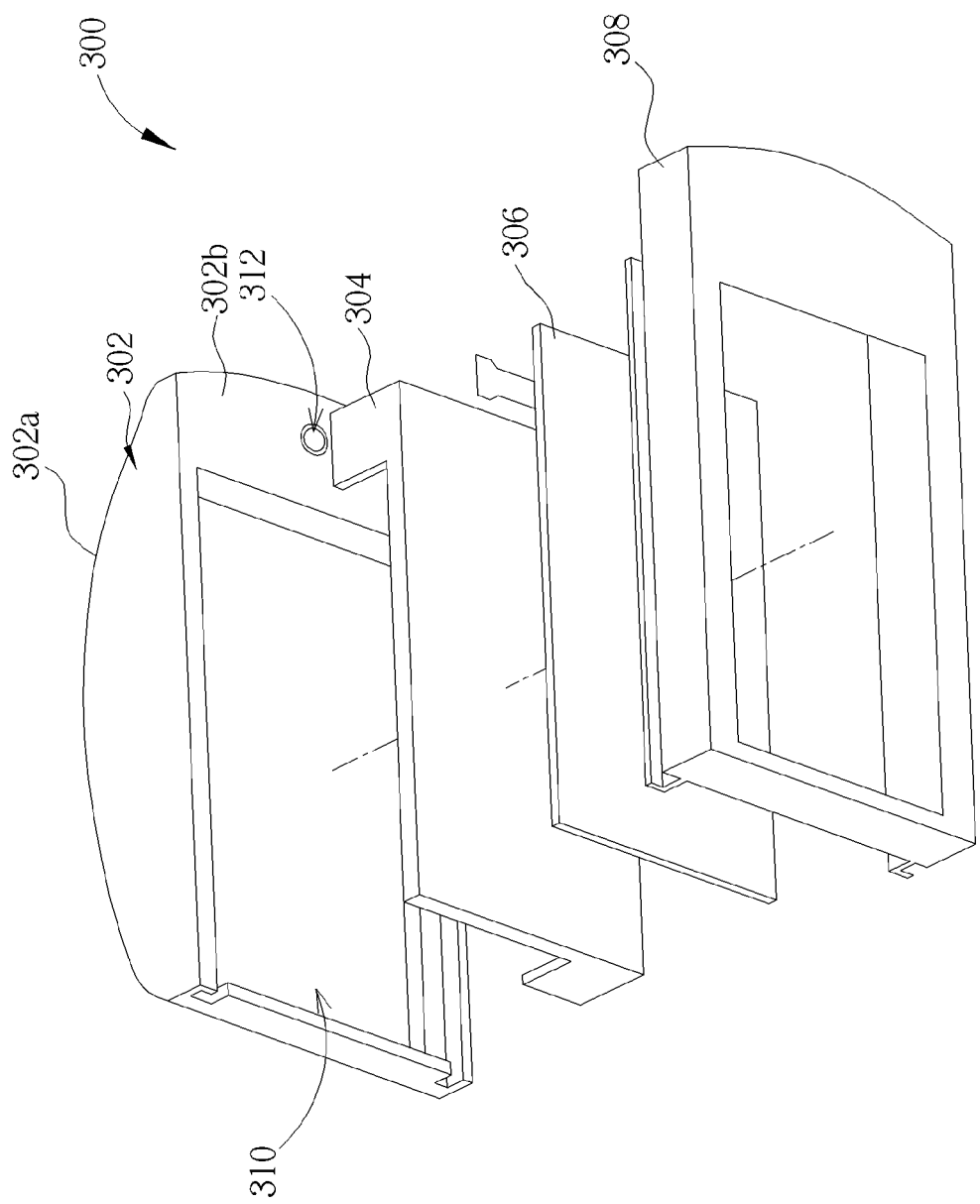
FIG. 4 is an explosive schematic diagram of an image eraser of the electronic writing system according to a third preferred embodiment of the present disclosure.
Figure 5:
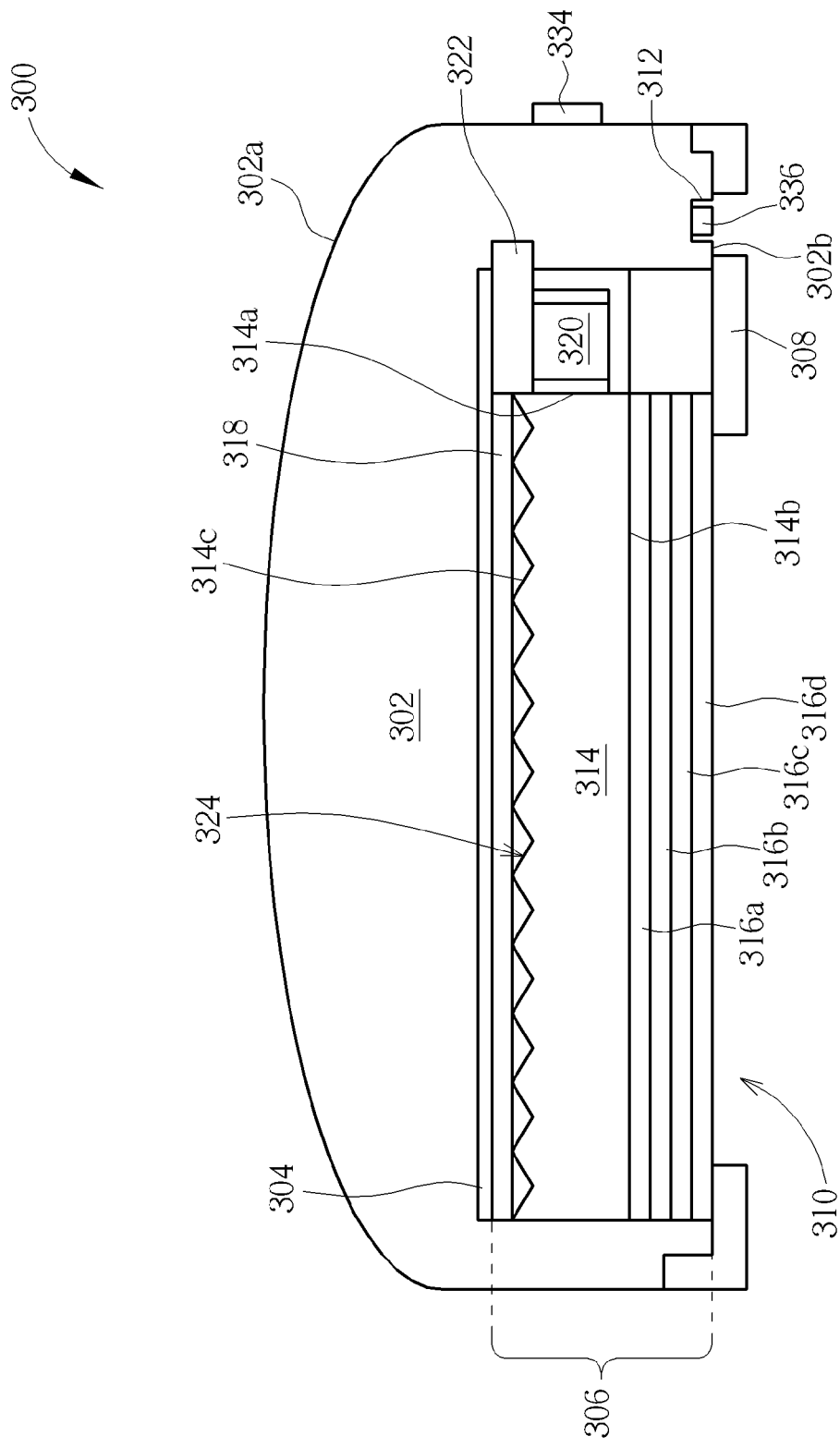
FIG. 5 is a sectional schematic diagram of the image eraser of the electronic writing system according to the third preferred embodiment of the present disclosure.

In addition, based the aforementioned display device, the present disclosure further provides an image eraser. Please refer to FIG. 4 and FIG. 5 together with FIG. 2, wherein FIG. 4 is an explosive schematic diagram of an image eraser of the electronic writing system according to a third preferred embodiment of the present disclosure, and FIG. 5 is a sectional schematic diagram of the image eraser of the electronic writing system according to the third preferred embodiment of the present disclosure. The image eraser 300 includes a holder 302, a partition 304, a light-emitting module 306 and a cover 308, and is used for cleaning the image displayed in at least one pixel region 102. In this embodiment, the holder 302 has an upper surface 302a and a lower surface 302b, wherein the upper surface 302a is used for enabling a user to hold the image eraser 300, and the lower surface 302b has a first cavity 310 and a second cavity 312. The partition 304 and the light-emitting module 306 are disposed in the first cavity 310 of the holder 302, and the partition 304 is disposed between the light-emitting module 306 and the holder 302. The cover 308 is disposed on the lower surface 302b of the holder 302 and covers the edge of the light-emitting module 306.

Furthermore, the light-emitting module 306 includes an LGP 314, a plurality of optical films, a reflective or transflective layer 318, a light source 320 and a circuit board 322. The LGP 314 has a light entrance surface 314a, a light exit surface 314b and a bottom surface 314c, and the light exit surface 314b and the light entrance surface 314a are perpendicularly connected to each other. The bottom surface 314c is disposed opposite to the light exit surface 314b and has a plurality of micro structures 324. Furthermore, the reflective or transflective layer 318 is disposed between the bottom surface 314c of the LGP 314 and the partition 304 for reflecting light to the light exit surface 314b. The optical films cover the light exit surface 314b of the LGP 314 for improving the utility efficiency of the light emitting out of the LGP 314. In this embodiment, the optical films include a lower diffuser 316a, two brightness enhancement films 316b and 316c and an upper diffuser 316d, and the lower diffuser 316a, the brightness enhancement films 316b and 316c and the upper diffuser 316d are disposed on the light exit surface 314b of the LGP 314 from bottom to top (from a near side to a far side of the light exit surface 314b) in order, but not limited thereto. In addition, each of the brightness enhancement films 316b and 316c respectively has a brightness enhancing structure, such as a prism structure, wherein the brightness enhancing structures are perpendicular to each other. The light-emitting module of the present disclosure is not limited to having a plurality of optical films, may have only one single optical film, which is one of the lower diffuser 316a, the brightness enhancement film 316b, the brightness enhancement film 316c and the upper diffuser 316d for example.

Furthermore, the light source 320 is disposed on the light entrance surface 314a of the LGP 314 and is used for generating a light to enter the LGP 314 through the light entrance surface 314a and the light emits out of the LGP 314 from the light exit surface 314b through being reflected by the micro structures 324 of the bottom surface 314c. The circuit board 322 is coupled to the light source 320 for electrically connecting the light source 320 to an external portion, such as a power supply and a switch. In this embodiment, the light source 320 is, but not limited to, a light-emitting diode (LED), and could be other light emitting devices. Furthermore, the light generated by the light source 320 has a fourth color that is a mixture of at least two colors selected from the first color, the second color and the third color. Therefore, the light could enable at least two of the optical sensors for sensing different colors in the display device 100 to be switched on, so as to execute the eraser function. In this embodiment, the light generated by the light source 320 is a white light that can enable all the optical sensors of the display device 100 to be switched on for executing the eraser function, but not limited thereto. In other embodiments of the present disclosure, the light generated by the light source 320 may be a far infrared ray (FIR). In other embodiments, the light-emitting module may include a plurality of light sources, and the light sources could respectively generate lights of at least two of the light with the first color, the light with the second color and the light with the third color. Furthermore, the LGP may have a plurality of light entrance surfaces 314a disposed corresponding to the light source 320.

Figure 6:
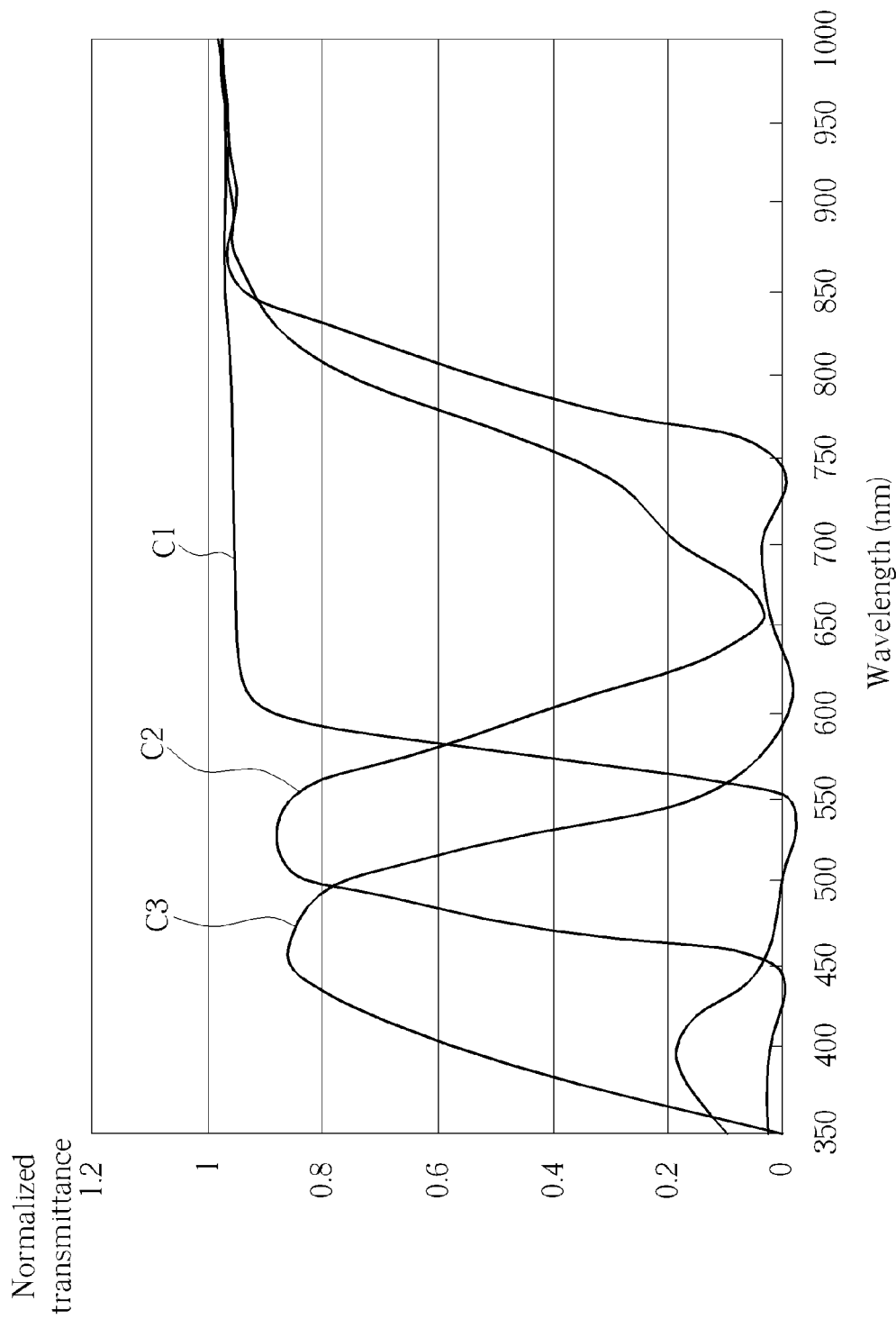
FIG. 6 is a schematic diagram illustrating the relative curve of the wavelengths of the lights penetrating the first color filters, the second color filters and the third color filters in the first preferred embodiment and the normalized transmittance.

In order to further explain the relationship between the wavelength range of lights that penetrate the first, second and third color filters and the selection of the color of the light source, the first, second, and third color filters in the first embodiment in collocation with the light source of the third embodiment are taking as the example for explanation. Please refer to FIG. 6 together with FIG. 5, wherein FIG. 6 is a schematic diagram illustrating the relative curve of the wavelengths of the lights penetrating the first color filters, the second color filters and the third color filters in the first preferred embodiment and the normalized transmittance. As shown in FIG. 5 and FIG. 6, the first curve C1 represents the relative curve of the wavelength of light penetrating the first color filters 108 and the normalized transmittance, the second curve C2 represents the relative curve of the wavelength of light penetrating the second color filters 110 and the normalized transmittance, and the third curve C3 represents the relative curve of the wavelength of light penetrating the third color filters 112 and the normalized transmittance. It can be seen that the first color filters 108 block the light with the wavelength in a range of from about 300 nanometers (nm) to about 550 nm, thus the penetrating light shows the color with red. The second color filters 110 block the light with the wavelength in a range of from about 300 nm to about 450 nm and of about 650 nm, thus the penetrating light shows the color with green. The third color filters 112 block the light with the wavelength in a range of from about 600 nm to 750 nm, thus the penetrating light shows the color with blue. Since the wavelength range of light generated by LED is smaller than that of the filtered light of the first color filters 108, the second color filters 110 and the third color filters 112, the fourth color may be a mixture of a blue light with a wavelength of 460 nm, a green light with a wavelength of 525 nm and a red light with a wavelength 645 nm, which shows the color of white. The fourth color of the light generated by the present disclosure light source 320 is not limited to white, and can be determined according to the filtered light wavelength ranges of the first color filters 108, the second color filters 110 and the third color filters 112 such that the light with the fourth color can penetrate at least two of the first color filters 108, the second color filters 110 and the third color filters 112. Accordingly, by estimating that at least two of the optical sensors are switched on at the same time, the control element in the display device 100 can decide to send out an erasing signal to execute the eraser function. For example, when the fourth color is yellow, the image eraser 300 emits yellow light to the display device 100, and the yellow light will penetrate the first color filters 108 with red and the second color filters 110 with green but will not penetrate the third color filters 112 with blue, thus the optical sensors disposed below and covered by the first color filters 108 and the second color filters 110 will sense the light. Since optical sensors covered by the first color filters 108 and second color filters 110 are switched on at the same time, the control element of the display device 100 decides to execute the eraser function.

Please refer to FIG. 5 again. The image eraser 300 of this embodiment further includes a switch 334 and a proximity sensor 336. The switch 334 is electrically connected to the light source 320 through the circuit board 322 for turning on or turning off the light source 320, and is disposed at a side of the holder 302 such that the user could conveniently switch on or switch of the image eraser 300, so as to save the power consumption. Furthermore, the proximity sensor 336 is disposed in the second cavity 312 of the holder 302. The second cavity 312 and the light exit surface 314*b* of the LGP 314 face the same direction, thus the proximity sensor 336 could sense if the light exit surface 314*b* of the LGP 314 is close to the display device 100. In this embodiment, the proximity sensor 336 can further send out a turning-on signal to the light source 320 for emitting out white light when it senses that the image eraser 300 is close to the display device 100. In contrary, the image eraser 300 will not emit out white light when it is not close to the display device 100, which prevents the image eraser 300 from removing any image that the user does not expect to remove as the image eraser 300 keeps on emitting out white light, and also saves the power consumption of the image eraser 300. In other embodiments of the present disclosure, the image eraser may only include the switch or only include the proximity sensor.

The image eraser of the present disclosure is not limited by the aforementioned embodiment and may have other different or variant embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 7:
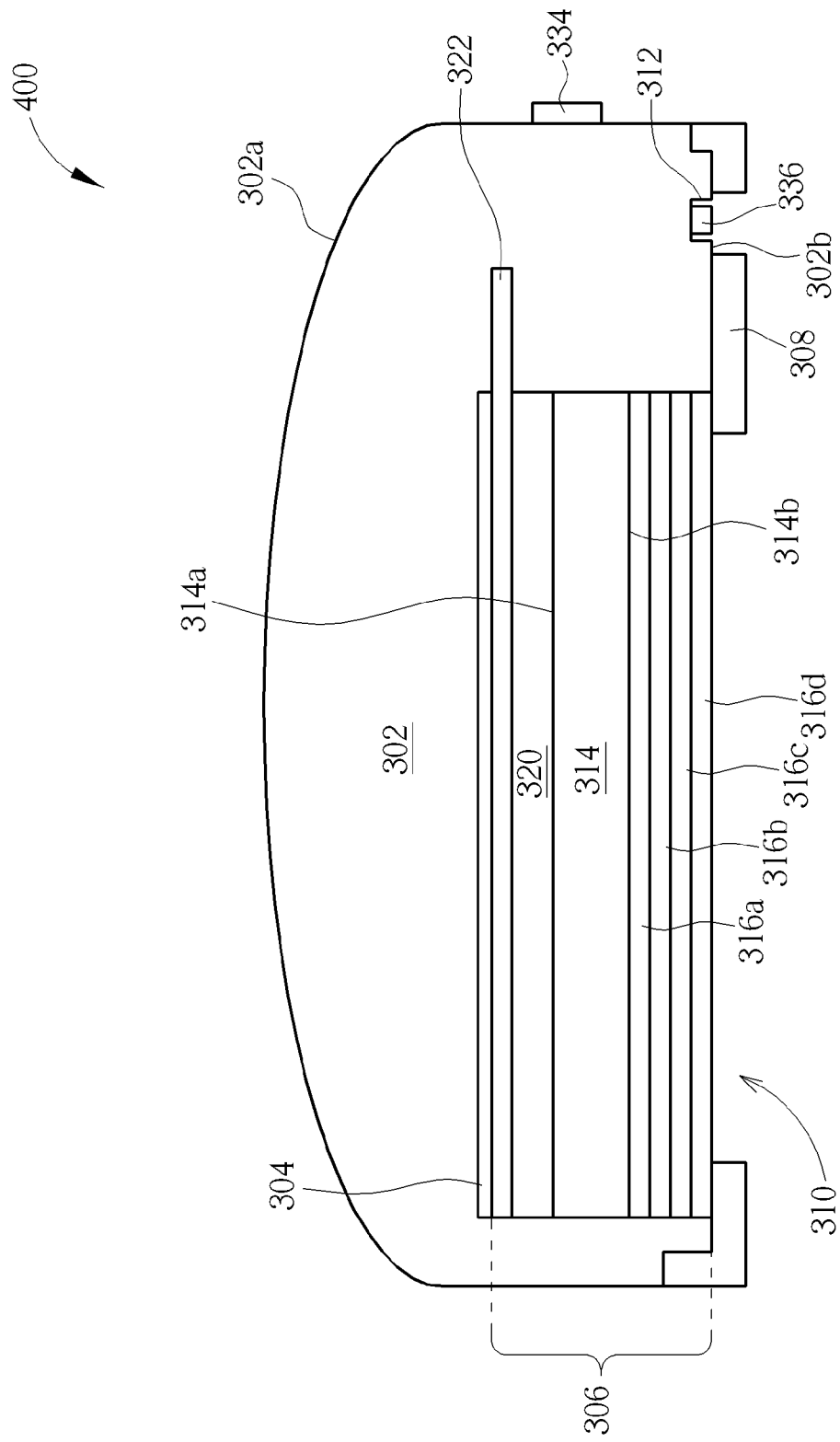
FIG. 7 is a sectional schematic diagram of an image eraser of an electronic writing system according to a fourth preferred embodiment of the present disclosure.

With reference to FIG. 7, FIG. 7 is a sectional schematic diagram of an image eraser of an electronic writing system according to a fourth preferred embodiment of the present disclosure. As shown in FIG. 7, in comparison with the third embodiment, the light entrance surface 314*a* and the light exit surface 314*b* of the LGP 314 are parallel with and face to each other in the image eraser 400 of this embodiment, which means the light entrance surface 314*a* is the bottom surface of the LGP 314 and the light source 320 is disposed between the holder 302 and the LGP 314. Furthermore, the bottom surface of the LGP 314 of this embodiment does not have micro structures, but not limited thereto.

Figure 8:
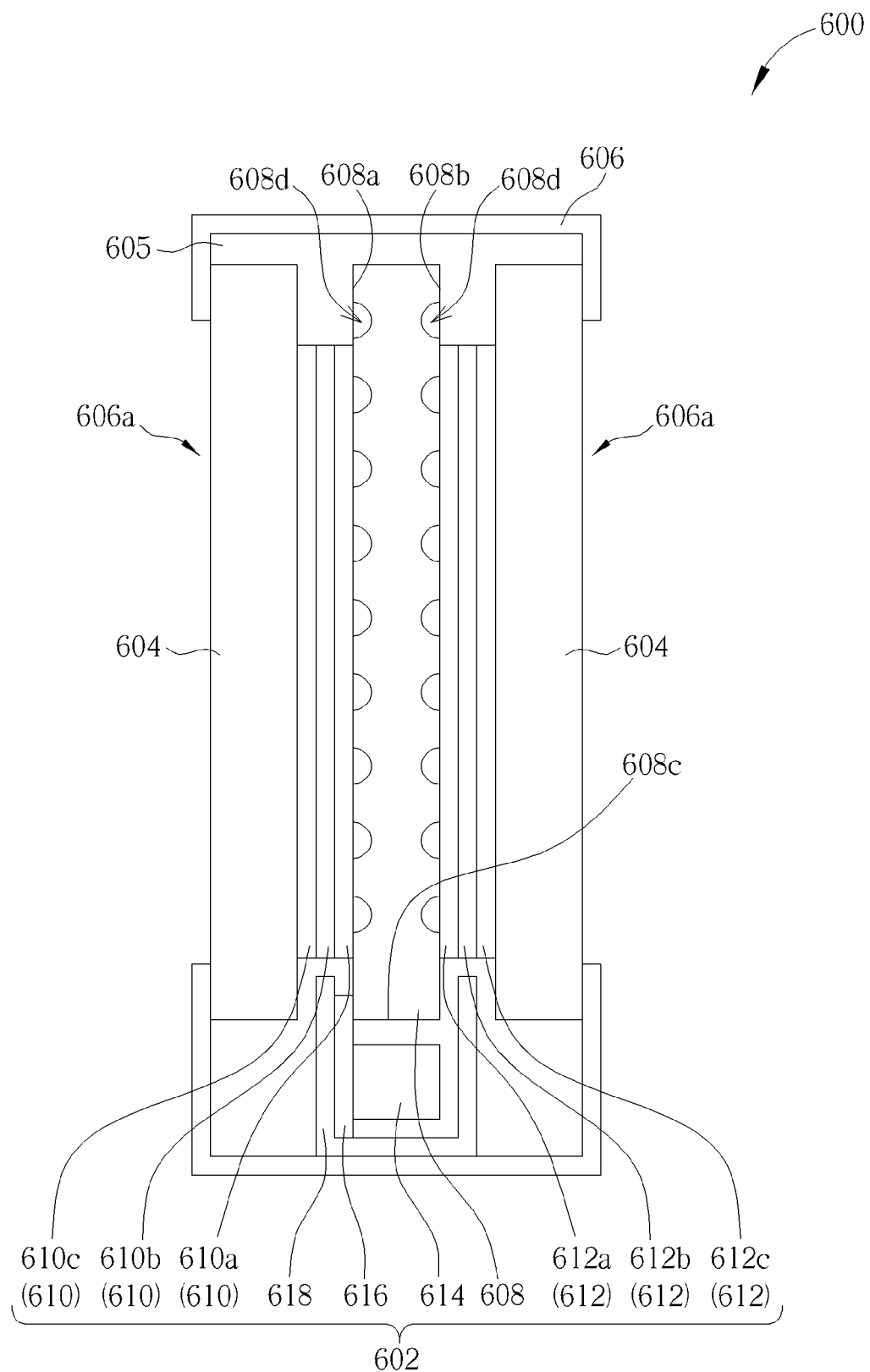
FIG. 8 is a sectional schematic diagram of an image eraser of an electronic writing system according to a fifth preferred embodiment of the present disclosure.

With reference to FIG. 8, FIG. 8 is a sectional schematic diagram of an image eraser of an electronic writing system according to a fifth preferred embodiment of the present disclosure. As shown in FIG. 8, in comparison with the third embodiment, the image eraser 600 is a two-sided light-emitting image eraser. In this embodiment, the image eraser 600 includes a light-emitting module 602, two cover substrates 604, a frame 605 and a holder 606. The holder 606 in this embodiment has two openings 606*a*, and the frame 605 is disposed in the holder 606. The light-emitting module 602 and the cover substrates 604 are fixed and assembled by the frame 605 in the holder 606, and the cover substrates 604, such as glass, plastic or quartz substrate, are disposed between the light-emitting module 602 and each opening 606*a* of the holder 606 respectively, so that each opening 606*a* exposes each cover substrate 604 respectively. Accordingly, the light-emitting module 602 that is configured to generated light toward the cover substrates 604 is disposed between the cover substrates 604. The holder 606 can be formed by an opaque material, so that the holder 606 can stop the light from emitting out from two opposite sides of the holder 606 and allow the light emitting out from the cover substrates 604. The light-emitting module 602 includes an LGP 608, a plurality of first optical films 610, a plurality of second optical films 612, a light source 614, a circuit board 616, and a bezel 618. The LGP 608 has a first light exit surface 608*a* and a second light exit surface 608*b* opposite to each other and a light entrance surface 608*c*, and each of the first light exit surface 608*a* and the second light exit surface 608*b* has a plurality of microstructures 608*d* thereon, such as v-cut grooves or spherical lens, but the present invention is not limited to this. The first optical films 610 and the second optical films 612 are disposed on the first light exit surface 608*a* and the second light exit surface 608*b* of the LGP 608 respectively, and are disposed between the LGP 608 and the cover substrates 604 respectively. The first optical films 610 of this embodiment includes a first lower diffuser 610*a*, a first cross brightness enhancement film 610*b* and a first upper diffuser 610*c*, and the first lower diffuser 610*a*, the first cross brightness enhancement film 610*b* and the first upper diffuser 610*c* are sequentially stacked on the first exit surface 608*b* of the LGP 608 from right to left (from a near side to a far side of the LGP 608) and disposed between one of the cover substrates 604 and the LGP 608. The second optical films 612 of this embodiment includes a second lower diffuser 612*a*, a second cross brightness enhancement film 612*b*, and a second upper diffuser 612*c*, and the second lower diffuser 612*a*, the second cross brightness enhancement film 612*b* and the second upper diffuser 612*c* are sequentially stacked on the second light exit surface 608*b* of the LGP 608 from left to right (from a near side to a far side of the LGP 608) and disposed between the other one of the cover substrates 604 and the LGP 608. Also, the first cross brightness enhancement film 610*b* and the second cross brightness enhancement film 612*b* respectively have a plurality of first prisms parallel to one another and a plurality of second prisms parallel to one another, and the first prisms cross the second prisms. The light source 614, the circuit board 616 and the bezel 618 are disposed on the light entrance surface 608c of the LGP 608, and the light source 614 is disposed on the circuit board 616 that electrically connects the light source 614 to the outsides. Furthermore, the bezel 618 is used to fix the light source 614 and the circuit board 616 on the light entrance surface 608c of the LGP 608, and can be U-shaped in this embodiment, but is not limited herein. In this embodiment, the light generated from the LGP 608 can be emitted toward the cover substrates 604, so that the image eraser 600 can generate the light at two sides thereof. Furthermore, the light generated from the LGP 608 can be recycled between the first cross brightness enhancement film 610a and the second cross brightness enhancement film 612a so as to enhance the light emitting out from the image eraser 600. In other embodiment of the present disclosure, the first upper diffuser and the second upper diffuser can be respectively replaced with a dual brightness enhancement film, so that the light generated from the LGP can be recycled between the dual brightness enhancement films. Thus, the brightness of the image eraser can be larger. The light-emitting module of the present disclosure is not limited to having a plurality of first optical films or limited to having a plurality of second optical films, may have only one single first optical film, which is one of the first lower diffuser, the first cross brightness enhancement film, the first upper diffuser and the dual brightness enhancement film for example or may have only one single second optical film, which is one of the second lower diffuser, the second cross brightness enhancement film, the second upper diffuser and the dual brightness enhancement film for example.

Figure 9:
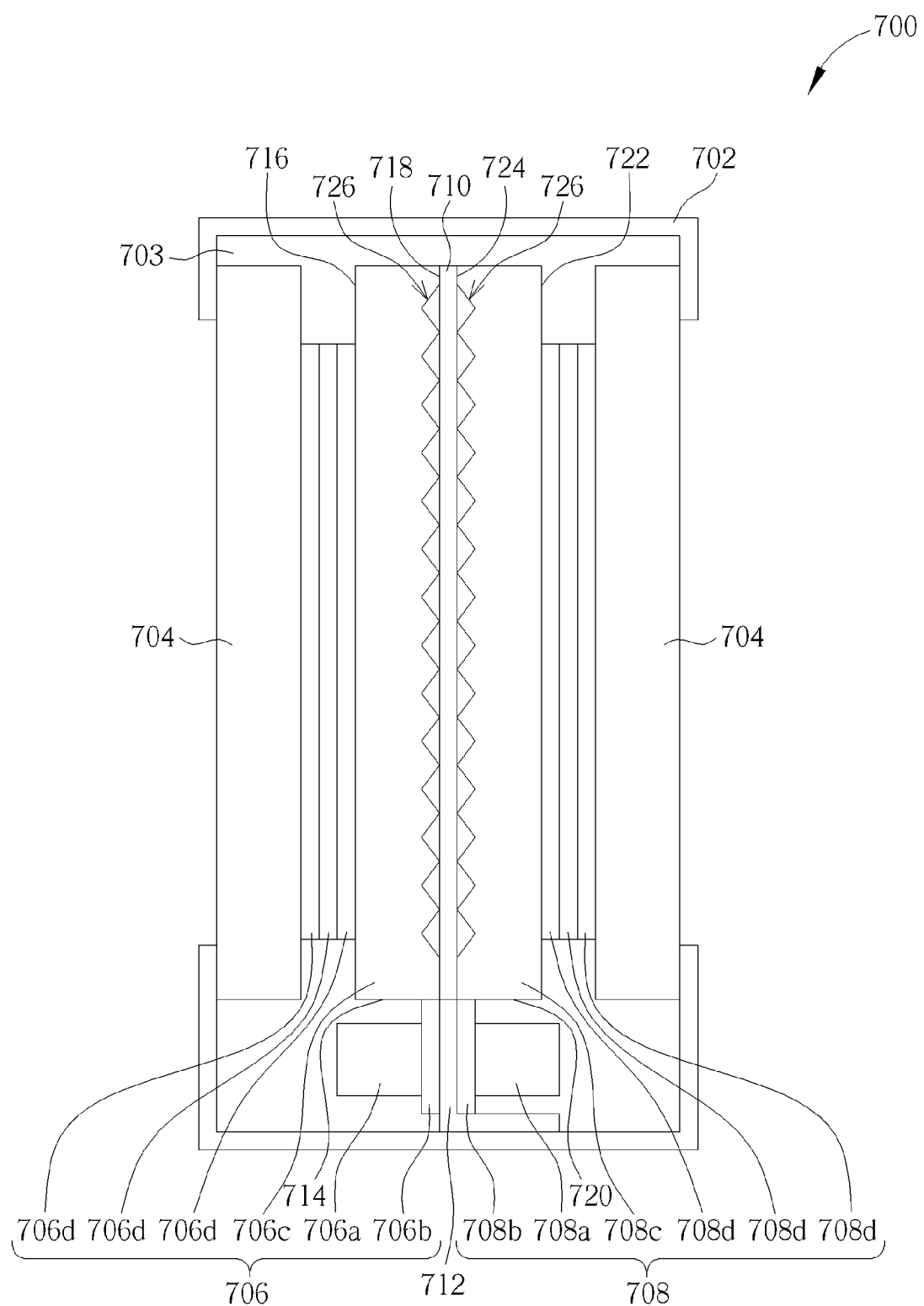
FIG. 9 is a sectional schematic diagram of an image eraser of an electronic writing system according to a sixth preferred embodiment of the present disclosure.

With reference to FIG. 9, FIG. 9 is a sectional schematic diagram of an image eraser of an electronic writing system according to a fifth preferred embodiment of the present disclosure. As shown in FIG. 9, in comparison with the fifth embodiment, the image eraser 700 can emit light from each side thereof individually, which means that the image eraser 700 can be controlled to emit the light from one side or emit the lights respectively from two sides. Besides the holder 702, the frame 703 and the cover substrates 704, the image eraser 700 further includes a first light-emitting module 706, a second light-emitting module 708, a reflective layer 710, and a bezel 712. The reflective layer 710 is disposed between the first light-emitting module 706 and the second light-emitting module 708. The first light-emitting module 706 includes a first light source 706a, a first circuit board 706b, a first LGP 706c, and a plurality of first optical films 706d, and the second light-emitting module 708 includes a second light source 708a, a second circuit board 708b, a second LGP 708c, and a plurality of second optical films 708d. The first optical films 706d and the second optical films 708d of this embodiment are the same as the first optical films of the fifth embodiment, and won't be detailed redundantly. The first light-emitting module of the present disclosure is not limited to having a plurality of first optical films, may have only one single first optical film, which is one of the first lower diffuser, the first cross brightness enhancement film, the first upper diffuser and the dual brightness enhancement film for example. The second light-emitting module of the present disclosure is not limited to having a plurality of second optical films, may have only one single second optical film, which is one of the second lower diffuser, the second cross brightness enhancement film, the second upper diffuser and the dual brightness enhancement film for example.

In addition, the first LGP 706c has a first light entrance surface 714, a first light exit surface 716 and a first bottom surface 718 disposed opposite to the first light exit surface 716, and the first LGP 706c is disposed between the reflective layer 710 and the first optical films 706d. The first light source 706a and the first circuit board 706b are disposed on the first entrance surface 714 of the first LGP 706c, and the first optical films 706d are disposed on the first light exit surface 716. The second LGP 708c has a second light entrance surface 720, a second light exit surface 722 and a second bottom surface 724 disposed opposite to the second light exit surface 722, and the second LGP 706c is disposed between the reflective layer 710 and the second optical films 708d. The second light source 708a and the second circuit board 708b are disposed on the second entrance surface 720 of the second LGP 708c, and the second optical films 708d are disposed on the second light exit surface 722. Furthermore, each of the first bottom surface 718 and the second bottom surface 724 has a plurality of microstructures 726 thereon, such as v-cut grooves or spherical lens. Thus, due to the reflective layer 710 being disposed between the first LGP 706c and the second LGP 708c, the light generated from the first light source 706a and the light generated from the second light source 708a can enter into the first LGP 706c and the second LGP 708c respectively, and be reflected by the reflective layer 710 to be emitted out from two sides of the image eraser 700. Therefore, the image eraser 700 of this embodiment can emit the light from two sides thereof individually. Furthermore, the bezel 712 of this embodiment is disposed between the first light source 706a and the second light source 708a and used to fix the first circuit board 706b which the first light source 706a is disposed on, and the second circuit board 708b which the second light source 708a is disposed on, and is L-shaped, but is not limited to this. In other embodiment of the present disclosure, the shape of the bezel can be an I-shaped structure between the first circuit board and the second circuit board, a reverse T-shaped structure extending from being between the first circuit board and the second circuit board to be under the first circuit board and the second circuit board, or a structure with the L-shaped structure rotated 180 degree with respect to a vertical line extending from being between the first circuit board and the second circuit board to be under the first circuit board.

Figure 10:
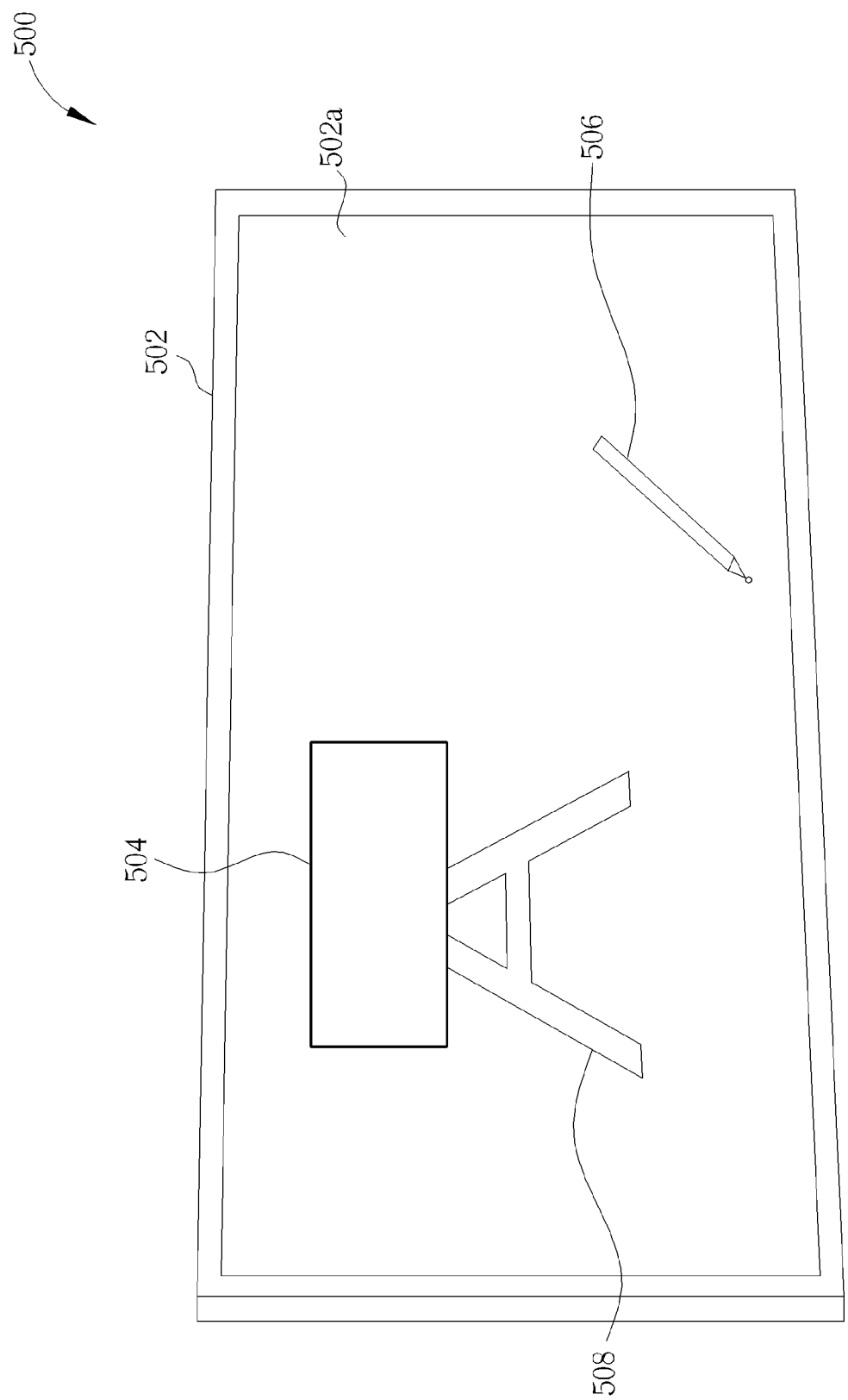
FIG. 10 is a schematic diagram of an electronic writing system according to a seventh preferred embodiment of the present disclosure.
Figure 11:
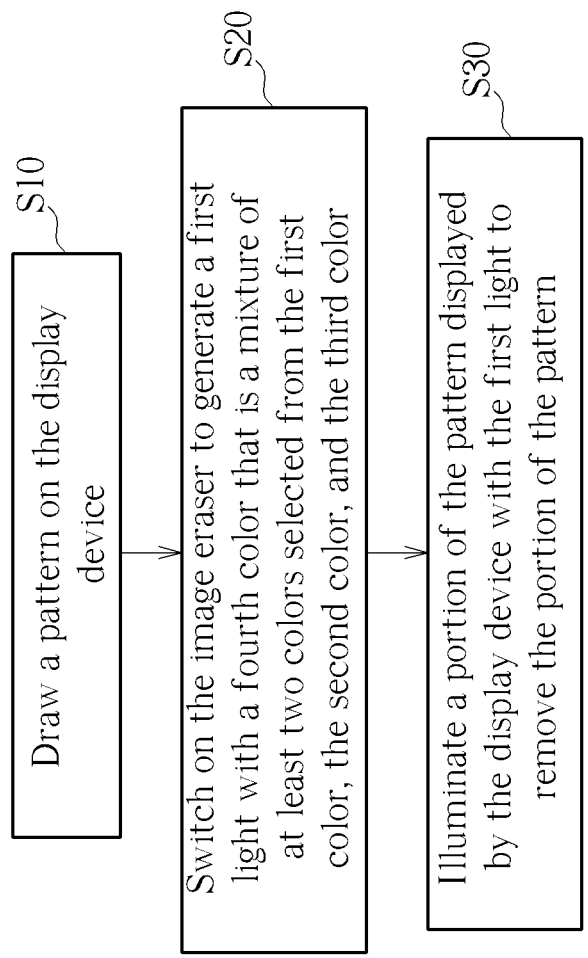
FIG. 11 is a schematic diagram of the flow chart of the operation method of the electronic writing system according to the seventh preferred embodiment of the present disclosure.
Figure 12:
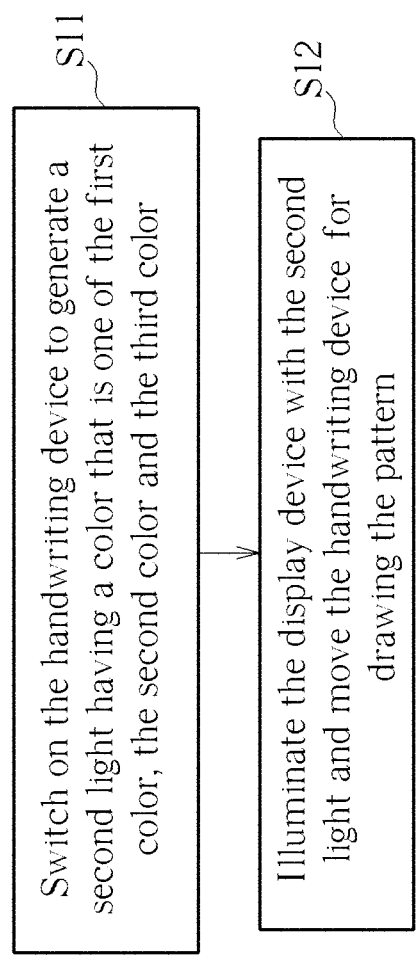
FIG. 12 is a schematic diagram of the flow chart of drawing a pattern in the electronic writing system according to the seventh preferred embodiment of the present disclosure.

In addition, according to the above-mentioned electronic writing system, the present disclosure further provides an operation method of the electronic writing system. Please refer to FIG. 10 to FIG. 12 together with FIG. 2 and FIG. 5, wherein FIG. 10 is a schematic diagram of an electronic writing system according to a seventh preferred embodiment of the present disclosure, FIG. 11 is a schematic diagram of the flow chart of the operation method of the electronic writing system according to the seventh preferred embodiment of the present disclosure, and FIG. 12 is a schematic diagram of the flow chart of drawing a pattern in the electronic writing system according to the seventh preferred embodiment of the present disclosure. As shown in FIG. 2, FIG. 5, FIG. 10 and FIG. 11, the electronic writing system 500 of this embodiment includes a display device 502, an image eraser 504 and a handwriting device 506. The display device 100 of the first embodiment and the image eraser 300 of the third embodiment are respectively taken as the display device 502 and the image eraser 504 for example, but not limited thereto, and the display device 502 may selectively be the display device 400 in the second embodiment. Furthermore, the portions of the display device 502 in the pixel regions 102 are used for displaying an image respectively, and the portions of the display device 502 in the sensing region 104 are used for sensing light. Each of the sensing regions 104 is corresponding to at least one pixel region 102, such that the portion of the display device 502 in each sensing region 104 send out a display signal to the portion of the display device 502 in the corresponding pixel region 102 when the sensing region 104 receives a light. In addition, the handwriting device 506 may be a light source device, such as a light pen. The operation method of the electronic writing system 100 of this embodiment includes:

Step S10: Draw a pattern 508 on the display device 502;

Step S20: Switch on the image eraser 504 to generate a first light with the fourth color that is a mixture of at least two colors selected from the first color, the second color and the third color; and Step S30: Illuminate a portion of the pattern 508 displayed by the display device 502 with the first light to remove the portion of the pattern 508.

As shown in FIG. 2, FIG. 5, FIG. 10 and FIG. 12, in Step 10, the steps for drawing the pattern 508 on the display device 502 may include:

Step S11: Switch on the handwriting device 506 to generate a second light, and the second light has one of the color among the first color, the second color and the third color; and Step S12: Illuminate the display device 502 with the second light and move the handwriting device 506 at the same time for drawing the pattern 508.

In Step S11, the display device 502 of this embodiment first displays a background image 502a, such as a white image, and then the user move the handwriting device 506 to the position of the display device 502 that he wants to draw the pattern 508. Sequentially, the user switches on the handwriting device 506 to generate the second light. In Step S12, the position of the display device 502 that the user wants to draw the pattern 508 on is illuminated by the second light. Since the second light has only one color among the first color, the second color and the third color, it penetrate only one of the first color filter 108, the second color filter 110 and the third color filter 112 of the display device 502, and therefore only one of the corresponding optical sensor among the first color filter 108, the second color filter 110 and the third color filter 112 will sense the second light and then deliver the display signal to the corresponding pixel region 102 of the display device 502. Accordingly, the portion of the display device 502 in the corresponding pixel region 102 will display a pattern dot corresponding to the color of the second light. Furthermore, by way of moving the handwriting device 506, a plurality of pattern dots corresponding to the color of the second light will be displayed by the portions of the display device 502 in pluralities of pixel regions 102, so as to form the pattern 508 corresponding to the color of the second light.

Please keep on referring to FIG. 2, FIG. 5, FIG. 10 and FIG. 11. In Step S20, in order to remove the pattern 508 or a portion of the pattern 508, the user may move the image eraser 504 to the portion of the pattern 508 displayed by the display device 502. In this embodiment, by way of turning on the switch of the image eraser 504, the light source of the image eraser 504 generates the first light with the fourth color. However, the present disclosure is not limited by the above description. The light source 320 may be turned on by the proximity sensor 336 of the image eraser 504 when the proximity sensor 336 senses that the image eraser 504 is close to the display device 502, so as to generate the first light with the fourth color. In Step S30, the portion of the display device 502 displaying the pattern 508 is illuminated with the first light. Since the fourth color is the mixture of at least two colors selected from the first color, the second color and the third color, the first light can penetrate at least two of the first color filter 108, the second color filter 110 and the third color filter 112. Accordingly, at least two optical sensors corresponding to two of the first color filter 108, the second color filter 110 and the third color filter 120 will sense the first light at the same time.

Therefore, when the control element of the display device 502 estimates the optical sensors corresponding to at least two kinds of colors are switched on, it sends out the erasing signal to the pixel regions 102 corresponding to the optical sensors sensing the light, such that the pixel regions 102 displays the dot having the same color as that of the background image for executing the eraser function. After that, by way of moving the image eraser 504, the pattern 508 displayed by the portions of the display device 502 in pluralities of pixel regions 102 can be removed.

In conclusion, the electronic writing system of the present disclosure adopts a movable image eraser to produce a light with a mixture color of at least two of the first color, the second color and the third color for sending out the erasing signal to the display device to remove the image displayed by the corresponding pixel regions by way of displaying a white image or a background image by the portions of the pixel regions. Accordingly, the user does not have to walk for a long distance for touching the functional icons in order to switch to the eraser function anymore, and the user can directly use the image eraser to remove the image displayed by the display device. Therefore, the inconvenience for the user is decreased.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic writing system, comprising:
   a display device for drawing a pattern with a handwriting device, the display device having a plurality of pixel regions and a plurality of sensing regions,
   a plurality of portions of the display device in the pixel regions being used for displaying an image respectively,
   a plurality of portions of the display device in the sensing regions being used for sensing light respectively emitted from the handwriting device or an image eraser, and
   wherein the handwriting device and the image eraser are two independent devices,
   each of the sensing regions being corresponding to at least one of the pixel regions to enable that when a portion of the display device in one of the sensing regions receives a light,
   the portion of the display device in the sensing region sends out a display signal to the portion of the display device in corresponding pixel region,
   wherein the display device comprises a plurality of first color filters having a first color, a plurality of second color filters having a second color and a plurality of third color filters having a third color respectively disposed in each of the sensing regions;
   switching on the image eraser for generating a first light with a fourth color, the fourth color being a mixture of at least two colors selected from the first color, the second color and the third color,
   wherein the image eraser comprises:
   a holder;
   a first light guide plate, disposed in the holder, the first light guide plate having at least one first light entrance surface and a first light exit surface,
   wherein the first light guide plate has a bottom surface disposed opposite to the first light exit surface, and the bottom surface has a plurality of micro structures;

a reflective or a transflective layer disposed between the first light guide plate and the holder, wherein the micro structures directly contact the reflective laver or the transflective laver;
at least one first light source, disposed on the first light entrance surface of the first light guide plate, for generating the first light, wherein the first light enters the first light guide plate through the first light entrance surface and emits out of the first light guide plate from the first light exit surface; and
at least one first optical film, covering the first light exit surface of the first light guide plate; and
wherein the first optical film comprises a lower diffuser, two brightness enhancement films, and an upper diffuser, and the lower diffuser, the two brightness enhancement films, and the upper diffuser are disposed on the first light exit surface of the first light guide plate from bottom to top in order,
illuminating the display device with the first light for erasing a portion of the pattern.

2. The electronic writing system of claim 1, further comprising a switch disposed at a side of the holder, the switch being used for turning on and turning off the first light source.

3. The electronic writing system of claim 1, further comprising a proximity sensor disposed in the holder.

4. The electronic writing system of claim 3, wherein the holder has a cavity, the cavity and the first light exit surface face a same direction, and the proximity sensor is disposed in the cavity.

5. The electronic writing system of claim 1, wherein the first light exit surface of the first light guide plate is perpendicularly connected to the first light entrance surface of the first light guide plate.

6. The electronic writing system of claim 1, wherein the first light entrance surface and the first light exit surface of the first light guide plate are parallel with and face to each other, and the light source is disposed between the holder and the first light guide plate.

7. The electronic writing system of claim 1, wherein the light generated by the first light source is far infrared ray (FIR).

8. The electronic writing system of claim 1, wherein the light generated by the first light source is a mixture of at least two colors of red light, green light, and blue light.

9. The electronic writing system of claim 1, further comprising at least one second optical film, and the first light guide plate disposed between the first optical film and the second optical film.

10. The electronic writing system of claim 9, wherein the first light guide plate has a second light exit surface opposite to the first light exit surface, and the second optical film covering the second light exit surface of the first light guide plate.

11. The electronic writing system of claim 9, further comprising two cover substrates, and the first optical film and the second optical film being respectively disposed between the first light guide plate and the cover substrates.

12. The electronic writing system of claim 1, further comprising:
a second light guide plate, disposed between the second optical film and the first light guide plate, and the second light guide plate having at least one second light entrance surface;
a second light source, disposed on the second light entrance surface of the second light guide plate; and
a reflective layer, disposed between the first light guide plate and the second light guide plate.

13. The electronic writing system of claim 12, further comprising at least one second optical film, and the second light guide plate being disposed between the second optical film and the reflective layer.

14. The electronic writing system of claim 12, wherein the first light guide plate having a first bottom surface disposed opposite to the first light exit surface, the second light guide plate having a second bottom surface disposed opposite to the second light exit surface, and each of the first bottom surface and the second bottom surface has a plurality of micro structures.

15. The electronic writing system of claim 12, further comprising a bezel disposed between the first light source and the second light source.

16. An operation method of an electronic writing system, comprising:
a drawing a pattern on a display device with a handwriting device, the display device having a plurality of pixel regions and a plurality of sensing regions,
a plurality of portions of the display device in the pixel regions being used for displaying an image respectively, a plurality of portions of the display device in the sensing regions being used for sensing light respectively emitted from the handwriting device or an image eraser, and
wherein the handwriting device and the image eraser are two independent devices,
each of the sensing regions being corresponding to at least one of the pixel regions to enable that when a portion of the display device in one of the sensing regions receives a light,
the portion of the display device in the sensing region sends out a display signal to the portion of the display device in corresponding pixel region,
wherein the display device comprises a plurality of first color filters having a first color, a plurality of second color filters having a second color and a plurality of third color filters having a third color respectively disposed in each of the sensing regions;
switching on the image eraser for generating a first light with a fourth color, the fourth color being a mixture of at least two colors selected from the first color, the second color and the third color, wherein the image eraser comprises:
a holder;
a first light guide plate, disposed in the holder, the first light guide plate having at least one first light entrance surface and a first light exit surface,
wherein the first light guide plate has a bottom surface disposed opposite to the first light exit surface, and the bottom surface has a plurality of micro structures;
a reflective or a transflective layer disposed between the first light guide plate and the holder, wherein the micro structures directly contact the reflective laver or the transflective laver;
at least one first light source, disposed on the first light entrance surface of the first light guide plate, for generating the first light, wherein the first light enters the first light guide plate through the first light entrance surface and emits out of the first light guide plate from the first light exit surface; and
at least one first optical film, covering the first light exit surface of the first light guide plate; and
wherein the first optical film comprises a lower diffuser, two brightness enhancement films, and an upper diffuser, and the lower diffuser, the two brightness enhancement films, and the upper diffuser are disposed on the first light exit surface of the first light guide plate from bottom to top in order,
illuminating the display device with the first light for erasing a portion of the pattern.

17. The operation method of the electronic writing system of claim 16, wherein drawing the pattern on the display device comprises:
switching on a handwriting device to generate a second light, the second light having a color which is one of the first color, the second color and the third color; and
illuminating the display device with the second light and moving the handwriting device for drawing the pattern.

\* \* \* \* \*